Patented Feb. 12, 1952

2,585,223

UNITED STATES PATENT OFFICE 2,585,223

PROCESS FOR PREPARING β-LACTONES EMPLOYING A URANYL SALT CATALYST

John R. Caldwell, Kingsport, Tenn., assignor to Eastman Kodak Company, Rochester, N. Y., a corporation of New Jersey No Drawing. Application August 6, 1949, Serial No. 109,055

18 Claims. (Cl. 260—344)

This invention relates to the preparation of β-lactones by reacting ketene ($CH_2=C=O$) with carbonyl compounds in the catalytic presence of certain uranyl salts according to the following reaction:

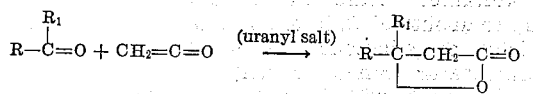

where R and $R_1$ represent hydrogen atoms or other groups defined below.

It is known that β-lactones can be produced by reacting ketene with carbonyl compounds in the catalytic presence of certain compounds such as Friedel-Crafts type catalysts (U. S. Patents Nos. 2,450,132 and 2,456,503), phosphoric acid esters (U. S. Patent No. 2,450,131), certain metal fluoborates (U. S. Patent No. 2,450,133), mercuric halides (U. S. Patent No. 2,450,134), certain perchlorates (U. S. Patent No. 2,450,116), $Zn(CNS)_2$ (U. S. Patent No. 2,450,117), $Zn(NO_3)_2$ (U. S. Patent No. 2,450,118), $Al_2O_3$, $ZrO_2$ and $SiO_2$ (U. S. Patent No. 2,462,357), carboxylic acid salts of certain metals (U. S. Patent No. 2,466,420), and boric acid and certain derivatives thereof (U. S. Patent No. 2,469,110). In utilizing such compounds as the above to catalyze the addition reaction of ketene with aldehydes, it is generally necessary to add the aldeyhyde to a solution containing the catalytic compound simultaneously with the addition of ketene in order to prevent objectionable aldehyde condensation products from forming upon contact of the aldehyde and the catalyst.

I have now found, quite unexpectedly, that certain uranyl salts can be used as superior catalysts in reacting ketene with carbonyl compounds to form β-lactones.

The employment of the particular uranyl salts as described more fully below, results in exceptionally high yields of β-lactones from both aldehyde and ketone type carbonyl compounds when reacted with ketene. Yields of up to 85 to 90% of β-lactones have been obtained, e. g., from the reaction of isobutyraldehyde or crotonaldehyde with ketene. The particular uranyl salts described below are especially valuable for employment in the reaction of aldehydes with ketene, because they do not promote condensation of the aldehyde with itself. Therefore, as an additional improved feature derived from the employment of these particular uranyl salts, it is possible to add them to the aldehyde at the beginning of the reaction with ketene whereas, with most of the other catalytic compounds known in the prior art, it has been necessary to add the aldehyde and ketene simultaneously to a solution containing the catalytic compound since otherwise undesirable aldehyde condensation products were produced.

It is accordingly an object of my invention to provide an improved process for preparing β-lactones in markedly improved yields. Other objects will become apparent hereinafter.

In accordance with my invention, I prepare β-lactones by reacting ketene ($CH_2=C=O$) with a carbonyl containing compound in the presence of at least one of the uranyl salts selected from the group consisting of uranyl chloride and uranyl nitrate.

The carbonyl containing compounds which can be advantageously employed in practicing my invention include aldehydes, ketones, diketones and various substituted derivatives thereof which are set forth below in more particularity.

The aldehydes which are advantageously employed in practicing my invention can be represented by the following general formula:

wherein $R_2$ represents an alkyl group (especially methyl, ethyl, isopropyl, n-propyl, n-butyl, isobutyl, secondary butyl and tertiary butyl groups, i. e., an alkyl group of the formula $C_nH_{2n+1}$ wherein $n$ represents a positive integer of from 1 to 4), an aralkyl group (especially benzyl or β-phenylethyl), and an aryl group (especially a monocyclic aryl group of the benzene series, e. g. phenyl, m-tolyl and p-tolyl). My new process is especially useful for the preparation of β-lactones from aldehydes of the above general formula wherein $R_2$ represents a hydrogen atom or a methyl group.

The ketones which are advantageously employed in practicing my invention can be represented by the following general formula:

wherein $R_3$ represents an alkyl group (especially methyl, ethyl, isopropyl, n-propyl, n-butyl, isobutyl, secondary butyl and tertiary butyl groups, i. e. an alkyl group of the formula $C_nH_{2n+1}$ wherein $n$ represents a positive integer of from 1 to 4), an aryl group (especially a monocyclic aryl group of the benzene series, e. g. phenyl, m-tolyl and p-tolyl), or an aralkyl group (especially benzyl and β-phenylethyl), and R$_4$ represents an alkyl group (especially methyl and ethyl groups), an aryl group (especially a monocyclic aryl group of the benzene series, e. g. phenyl, m-tolyl and p-tolyl), or an aralkyl group (especially benzyl and β-phenylethyl). My new process is especially useful for the preparation of β-lactones from the above-formulated ketones wherein R$_4$ represents a methyl group.

The diketones which are advantageously employed in practicing my invention can be represented by the following general formula:

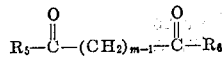

wherein R$_5$ and R$_6$ each represent an alkyl group (especially a methyl, an ethyl or an n-propyl group) and $m$ represents a positive integer of from 1 to 3.

The keto carboxylic esters which are advantageously employed in practicing my invention can be represented by the following general formula:

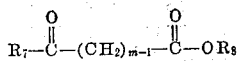

wherein R$_7$ represents an alkyl group (especially methyl and ethyl groups), R$_8$ represents an alkyl group (especially methyl, ethyl, isopropyl, n-propyl, n-butyl, isobutyl and secondary butyl groups) and $m$ represents a positive integer of from 1 to 3.

Other carbonyl containing compounds can also be advantageously employed. Thus, aldehydes and ketones containing ether radicals, cycloalkyl radicals, or radicals having olefinic linkages (e. g., crotonaldehyde) can be employed. Aryl diketones such as quinone can be employed. Also, carbonyl compounds such as furfural can be employed.

Typical of the aldehydes, ketones, diketones and keto carboxylic esters are: formaldehyde, acetaldehyde, propionaldehyde, n-butyraldehyde, isobutyraldehyde, phenylacetaldehyde, benzaldehyde, p-methylbenzaldehyde, crotonaldehyde, furfuraldehyde, acetone, ethyl methyl ketone, methyl n-propyl ketone, methyl isopropyl ketone, methyl n-butyl ketone, methyl isobutyl ketone, diethyl ketone, methyl isopropenyl ketone, acetophenone, methyl benzyl ketone, p-methylacetophenone, diacetyl, dipropionyl, di-n-butyryl, diisobutyryl, acetyl acetone, hexanedione-2,4, methyl pyruvate, ethyl pyruvate, methyl acetoacetate, ethyl acetoacetate, n-propyl acetoacetate, n-butyl acetoacetate, ethyl levulinate, methyl levulinate, acetonyl acetone, etc.

Those particular uranyl salts which are advantageously employed as catalysts in practicing my invention consist of uranyl chloride, viz., UO$_2$Cl$_2$, and uranyl nitrate, viz., UO$_2$(NO$_3$)$_2$. Either anhydrous uranyl salts or salts containing water of hydration can be employed.

The quantity of catalyst employed can be varied; optimum concentrations are usually dependent upon the reactants involved. Ordinarily a concentration of catalyst equal to from about 0.01% to about 2% of the weight of the carbonyl compound being reacted, can be advantageously employed. Higher concentrations can be used, although ordinarily no advantage is thereby derived. For practical purposes, it is most advantageous to employ from about 0.1 to about 0.5% uranyl salt based on the weight of the carbonyl compound being reacted.

Advantageously the reaction is conducted in a liquid medium containing the catalyst and into which the ketene can be introduced. Advantageously, the liquid medium consists of a solvent for the reactants which is a liquid at the reaction temperature, i. e., an organic liquid which dissolves the reactants but is relatively inert thereto. Suitable solvents include the dialkyl ethers such as diethyl ether and diisopropyl ether, cyclic ethers such as 1,4-dioxane, etc. Such solvents act as diluents in conducting the reaction and enable the reaction to be carried out under mild conditions which are advantageous since ordinarily, the β-lactones are relatively unstable. In many instances it is most advantageous to carry out the reaction in a solution of the same β-lactone being produced; such a procedure makes it unnecessary to subsequently remove the solvent during purification of the reaction mixture. It is frequently advantageous to employ the carbonyl compound being reacted as the solvent, when the carbonyl compound is a liquid at the reaction temperatures being employed and is capable of dissolving the catalyst.

The temperatures used in carrying out the process of my invention are advantageously maintained within the range from about —40° up to about 50° C. in order to obtain satisfactory yields of β-lactones. The most advantageous temperature range for carrying out any particular reaction will depend necessarily upon the properties and reactivity of the carbonyl compound being employed and on the solvent or diluent being used when it differs therefrom.

The process of my invention can be carried out batchwise or continuously, e. g., in the continuous manner described in Patent No. 2,469,690 issued May 10, 1949, to Hagemeyer and Cooper. If the ketene (CH$_2$=C=O) employed is prepared by the catalytic pyrolysis of acetic acid at reduced pressure, it is advantageous to carry out my process in a scrubber-type reactor, e. g. in a manner such as described in Patent No. 2,469,704, issued May 10, 1949, to H. G. Stone wherein for example, ketene and furfural can be reacted employing a suitable solvent and uranyl chloride and/or uranyl nitrate as the catalyst.

Upon completion of the reaction, it is advantageous from a practical viewpoint, but not always necessary, to remove the catalyst prior to separating the β-lactone from the reaction mixture. This can be accomplished by treating the reaction mixture with a small amount of an aqueous solution containing an alkali metal carbonate such as sodium or potassium carbonate. The precipitated uranyl salt is then removed by decanting the solution therefrom or by filtration.

Many of the β-lactones can be distilled from the reaction mixtures under reduced pressures. However, many of the β-lactones derived from aldehydes and ketones containing olefinic or acetylenic bonds (e. g. crotonaldehyde, methyl isopropenyl ketone, furfuraldehyde, etc.) and many of the β-lactones derived from keto carboxylic esters and diketones cannot be distilled, even under reduced pressure, without undergoing decarboxylation, i. e., loss of carbon dioxide, to give unsaturated compounds Even the lower molecular weight β-lactones derived from lower molecular weight aldehydes and ketones, e. g. formaldehyde, acetaldehyde, acetone and ethyl methyl ketone, have a tendency to polymerize when heated. With these lower molecular weight β-lactones, it is advantageous to flash distill (i. e. distill rapidly under a low vacuum, the pump producing the vacuum having a capacity greater than the volume of vapor in the still) the reaction mixture and then to purify further the β-lactone by fractional redistillation under reduced pressure.

In some cases, it is most advantageous from a practical aspect to bring about a rearrangement of the β-lactone to form an α-β unsaturated carboxylic acid, by hydrolyzing the β-lactone to give the corresponding β-hydroxy carboxylic acid and subsequently subjecting the β-hydroxy acid to dehydration to produce the corresponding α-β unsaturated carboxylic acid. Such a process can be illustrated as follows:

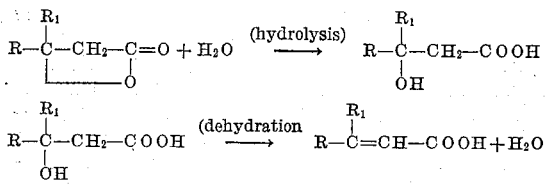

where R and R₁ represent hydrogen atoms or other groups as defined above.

Furthermore, the β-lactones produced may often be advantageously subjected to pyrolysis whereby decarboxylation is brought about by the loss of carbon dioxide. This can be illustrated as follows:

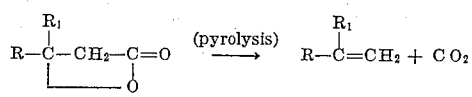

where R and R₁ represent hydrogen atoms or other groups as defined above. The resulting unsaturated compounds have many valuable uses such as being valuable intermediates in the preparation of derivatives therefrom, etc.

The β-lactones produced in accordance with the practice of my invention are valuable intermediates in the preparation of unsaturated esters, amides and nitriles. The α-β unsaturated acids which can be produced have similarly valuable utility.

The following examples will serve to illustrate further the manner of practicing my invention.

EXAMPLE 1

β-Propionolactone

A product comprising β-propionolactone having the following formula

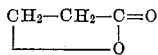

was prepared by mixing gaseous ketene and gaseous formaldehyde in equimolecular quantities and passing the mixed gases into a solution consisting of 0.2 gram of uranyl nitrate hexahydrate dissolved in 70 cc. of diethyl ether. The solution was constantly stirred and its temperature was maintained between 0° and 10° C. during the process. The passage of the gaseous reactants into the stirred solution was continued until one gram mol of each reactant had been absorbed. The reaction mixture was then stirred with a solution of 0.5 gram of sodium carbonate dissolved in 2 cc. of water. This resulted in the precipitation of the catalyst. The solution was then decanted from the precipitate and distilled to give β-propionolactone in a yield of 70 to 80%. The β-propionolactone had a boiling point of 37° to 40° C. at a pressure of 4 mm. of mercury. The gaseous ketene which was employed was prepared by the pyrolysis of acetone with an electrically heated Nichrome coil. The gaseous monomeric formaldehyde was prepared by heating paraformaldehyde to a temperature of 140° to 160° C.

EXAMPLE 2

β-Methyl-β-butyrolactone and dimethyl acrylic acid prepared therefrom

An intermediate product comprising β-methyl-β-butyrolactone having the formula:

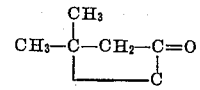

was prepared by passing ketene into a solution consisting of 0.2 gram of anhydrous uranyl chloride dissolved in 250 cc. of acetone. The solution was efficiently stirred and its temperature was maintained between 20° and 25° C. during the process. The passage of ketene into the solution was continued until one gram mole (42 grams) had been absorbed. The reaction mixture then contained the β-lactone of β-methyl-β-hydroxybutyric acid (β-methyl-β-butyrolactone). The β-lactone contained in the reaction mixture was then hydrolyzed by being mixed with 30 cc. of water and 33 cc. of concentrated HCl. The solution was then distilled through a column. After most of the acetone and water had been removed, crystals of the rearranged β-lactone now in the form of dimethyl acrylic acid having the following formula:

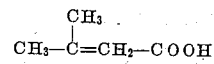

began to form in the condenser. The remainder of the aqueous solution was then extracted with diethyl ether in order to remove the dimethyl acrylic acid which was subsequently separated and purified further by recrystallization from water. The dimethyl acrylic acid was obtained in a yield of between 85 and 90% based on the amount of ketene employed. The dimethyl acrylic acid titrated to give an equivalent weight of 100.0 as compared to the calculated equivalent weight of 100.0.

EXAMPLE 3

β-Acetylmethyl-β-butyrolactone and pyrolysis products thereof

A product comprising β-acetylmethyl-β-butyrolactone of the following formula:

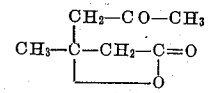

was prepared by passing gaseous ketene into a solution consisting of 0.3 gram of uranyl chloride dissolved in 200 grams of acetyl acetone, i. e. $CH_3$—CO—$CH_2$—CO—$CH_3$. The solution was efficiently stirred and its temperature was maintained between 25° and 30° C. during the process. The passage of ketene into the stirred solution was continued until 42 grams (1 gram mole) had been absorbed. The reaction mixture was then stirred for 5 minutes with a solution of 0.5 gram of sodium carbonate dissolved in 1 cc. of water. This resulted in the precipitation of the catalyst. The reaction mixture was then filtered and the filtrate was distilled under reduced pressure. The lactone, β-acetylmethyl-β-butyrolactone, which had formed was pyrolyzed to give carbon dioxide and a 30 to 40% yield of 2-methylpentene-1-one-4, i. e. $CH_3$—CO—$CH_2$—C($CH_3$)=$CH_2$, which had a boiling point of 127° C. at a pressure of 735 mm. of mercury, and an index of refraction $N_D^{20}$ of 1.4412. As an additional product of the pyrolysis, a 15 to 20% yield was obtained of diisopropyl methane, i. e.

$$CH_3—CH(CH_3)—CH_2—CH(CH_3)—CH_3$$

which had a boiling point of 88° C. at a pressure of 735 mm. of mercury, and an index of refraction $N_D^{20}$ of 1.4399. The latter product was apparently produced by the decarboxylation of some di-β-lactone which had been formed by the reaction of ketene with both keto groups of the acetyl acetone.

EXAMPLE 4

*β-(β-Carbomethoxyethyl)-β-butyrolactone and pyrolysis product thereof*

A product comprising β-(β-carbomethoxyethyl)-β-butyrolactone having the following formula:

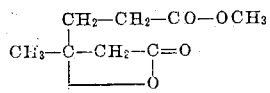

was prepared by passing ketene into a solution consisting of 0.4 gram of uranyl nitrate dissolved in 200 grams of methyl levulinate, i. e.

$$CH_3—CO—CH_2—CH_2—COOCH_3$$

The solution was efficiently stirred and its temperature was maintained between 15 and 20° C. during the process. The passage of ketene into the stirred solution was continued until 42 grams (1 mol) of ketene had been absorbed. This was done over a period of 2½ hours. The reaction mixture was then stirred with a solution of 0.6 gram of sodium carbonate dissolved in 2 cc. of water. This resulted in the precipitation of the catalyst. The reaction mixture which contained β-(β-carbomethoxyethyl)-β-butyrolactone was then filtered and the filtrate distilled at reduced pressure. The product was the methyl ester of 4-methyl-4-pentenoic acid, i. e.

$$CH_2=C(CH_3)—CH_2—CH_2—COOCH_3$$

in a yield of from 50 to 60%. This product was the result of the pyrolytic loss of $CO_2$ from the β-lactone present in the reaction mixture distilled. This product had a boiling point of 54° C. at a pressure of 20 mm. of mercury, and an index of refraction $N_D^{20}$ of 1.4224.

EXAMPLE 5

*γ-Methyl-β-valerolactone*

A product comprising the lactone (γ-methyl-β-valerolactone), of the following formula:

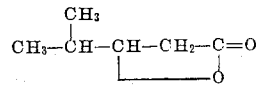

was prepared by passing ketene into a solution of 0.2 gram of uranyl chloride dissolved in a mixture of 200 grams of freshly distilled isobutyraldehyde, i. e. $CH_3—CH(CH_3)—CHO$, and 150 cc. of diisopropyl ether, i. e.

$$CH_3—CH(CH_3)—O—CH(CH_3)—CH_3$$

The solution was efficiently stirred and its temperature was maintained at 0° C. during the process. The passage of ketene into the stirred solution was continued until 1 gram mol of ketene (42 grams) had been absorbed. This was done over a period of 2 hours. The reaction mixture was then stirred for 10 minutes with a solution of 0.3 gram of sodium carbonate dissolved in 1 cc. of water. This resulted in the precipitation of the catalyst. The isopropyl ether was then removed by distillation under a vacuum. The remainder of the reaction mixture was then distilled under reduced pressure to give a yield of 85 to 90% of γ-methyl-β-valerolactone which had a boiling point of 110° to 113° C. at a pressure of 10 mm. of mercury. This lactone was relatively stable and showed little tendency to lose $CO_2$ during the distillation process.

In a manner similar to that illustrated in the foregoing examples, ketene can be reacted with methyl n-propyl ketone in the presence of uranyl nitrate to produce a β-lactone which pyrolyzes to form methyl-n-propyl acrylic acid; ketene can be reacted with acetonyl acetone in the presence of uranyl nitrate to produce a β-lactone which pyrolyzes to form 5-oxo-2-methyl-hexenoic acid and some 1,2-diisopropyl ethane; ketene can likewise be reacted with ethyl pyruvate in the presence of uranyl chloride to produce a β-lactone which pyrolyzes to form the ethyl ester of 2-methyl-2-propenoic acid; ketene can also be reacted with crotonaldehyde in the presence of uranyl chloride to produce an 85–90% yield of the B-lactone of 3-hydroxy-4 hexenoic acid.

What I claim as my invention and desire to secure by Letters Patent of the United States is:

1. A process for preparing a β-lactone comprising reacting ketene ($CH_2=C=O$) with a carbonyl compound selected from the group represented by the following four general formulas:

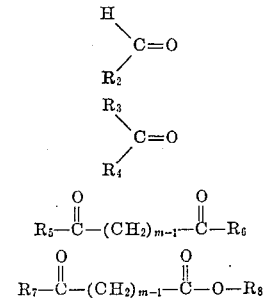

wherein $R_2$ represents a member selected from the group consisting of a hydrogen atom, an alkyl group of the formula $C_nH_{2n+1}$ wherein $n$ represents a positive integer of from 1 to 4, a benzyl group, a β-phenylethyl group and a phenyl ($C_6H_5$—) group, $R_3$ and $R_4$ each represents a member selected from the group consisting of an alkyl group of the formula $C_nH_{2n+1}$ wherein $n$ represents a positive integer of from 1 to 4, $R_5$ and $R_6$ each represents an alkyl group of the formula $C_nH_{2n+1}$ wherein $n$ represents a positive integer of from 1 to 3, $R_7$ represents an alkyl group selected from the group consisting of methyl and ethyl groups, and $R_8$ represents a member selected from the group consisting of primary and secondary alkyl groups of the formula $C_nH_{2n+1}$ wherein $n$ represents a positive integer of from 1 to 4 and $m$ represents a positive integer from 1 to 3, in the presence of at least one of the anhydrous and hydrated uranyl salts selected from the group consisting of uranyl chloride and uranyl nitrate, at a temperature of from −40° to 50° C.

2. A process for preparing a β-lactone comprising reacting ketene ($CH_2=C=O$) with a carbonyl compound selected from the group represented by the following four general formulas:

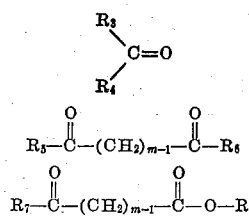

$$R_5-\overset{O}{\underset{\|}{C}}-(CH_2)_{m-1}-\overset{O}{\underset{\|}{C}}-R_6$$

$$R_7-\overset{O}{\underset{\|}{C}}-(CH_2)_{m-1}-\overset{O}{\underset{\|}{C}}-O-R_8$$

wherein $R_2$ represents a member selected from the group consisting of a hydrogen atom, an alkyl group of the formula $C_nH_{2n+1}$ wherein $n$ represents a positive integer of from 1 to 4, a benzyl group, a $\beta$-phenylethyl group and a phenyl ($C_6H_5$—) group, $R_3$ and $R_4$ each represents a member selected from the group consisting of an alkyl group of the formula $C_nH_{2n+1}$ wherein $n$ represents a positive integer of from 1 to 4, $R_5$ and $R_6$ each represents an alkyl group of the formula $C_nH_{2n+1}$ wherein $n$ represents a positive integer of from 1 to 3, $R_7$ represents an alkyl group selected from the group consisting of methyl and ethyl groups, and $R_8$ represents a member selected from the group consisting of primary and secondary alkyl groups of the formula $C_nH_{2n+1}$ wherein $n$ represents a positive integer of from 1 to 4 and $m$ represents a positive integer from 1 to 3, in the presence of at least one of the anhydrous and hydrated uranyl salts selected from the group consisting of uranyl chloride and uranyl nitrate, at a temperature of from $-20°$ C. to $50°$ C.

3. A process for preparing a $\beta$-lactone comprising reacting ketene ($CH_2=C=O$) with a carbonyl compound selected from the group represented by the following four general formulas:

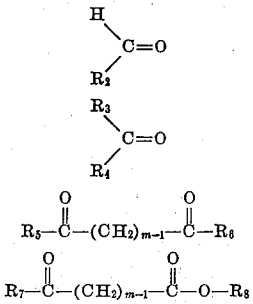

$$R_5-\overset{O}{\underset{\|}{C}}-(CH_2)_{m-1}-\overset{O}{\underset{\|}{C}}-R_6$$

$$R_7-\overset{O}{\underset{\|}{C}}-(CH_2)_{m-1}-\overset{O}{\underset{\|}{C}}-O-R_8$$

wherein $R_2$ represents a member selected from the group consisting of a hydrogen atom, an alkyl group of the formula $C_nH_{2n+1}$ wherein $n$ represents a positive integer of from 1 to 4, a benzyl group, a $\beta$-phenylethyl group and a phenyl ($C_6H_5$—) group, $R_3$ and $R_4$ each represents a member selected from the group consisting of an alkyl group of the formula $C_nH_{2n+1}$ wherein $n$ represents a positive integer of from 1 to 4, $R_5$ and $R_6$ each represents an alkyl group of the formula $C_nH_{2n+1}$ wherein $n$ represents a positive integer of from 1 to 3, $R_7$ represents an alkyl group selected from the group consisting of methyl and ethyl groups, and $R_8$ represents a member selected from the group consisting of primary and secondary alkyl groups of the formula $C_nH_{2n+1}$ wherein $n$ represents a positive integer of from 1 to 4 and $m$ represents a positive integer from 1 to 3, in the presence of from 0.01% to 2% by weight of the carbonyl compound of at least one of the anhydrous and hydrated uranyl salts selected from the group consisting of uranyl chloride and uranyl nitrate, at a temperature of from $-40°$ to $50°$ C.

4. A process for preparing a $\beta$-lactone comprising reacting ketene ($CH_2=C=O$) with a carbonyl compound selected from the group represented by the following four general formulas:

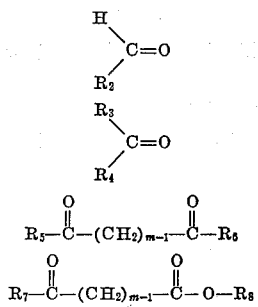

$$R_5-\overset{O}{\underset{\|}{C}}-(CH_2)_{m-1}-\overset{O}{\underset{\|}{C}}-R_6$$

$$R_7-\overset{O}{\underset{\|}{C}}-(CH_2)_{m-1}-\overset{O}{\underset{\|}{C}}-O-R_8$$

wherein $R_2$ represents a member selected from the group consisting of a hydrogen atom, an alkyl group of the formula $C_nH_{2n+1}$ wherein $n$ represents a positive integer of from 1 to 4, a benzyl group, a $\beta$-phenylethyl group and a phenyl ($C_6H_5$—) group, $R_3$ and $R_4$ each represents a member selected from the group consisting of an alkyl group of the formula $C_nH_{2n+1}$ wherein $n$ represents a positive integer of from 1 to 4, $R_5$ and $R_6$ each represents an alkyl group of the formula $C_nH_{2n+1}$ wherein $n$ represents a positive integer of from 1 to 3, $R_7$ represents an alkyl group selected from the group consisting of methyl and ethyl groups, and $R_8$ represents a member selected from the group consisting of primary and secondary alkyl groups of the formula $C_nH_{2n+1}$ wherein $n$ represents a positive integer of from 1 to 4 and $m$ represents a positive integer from 1 to 3, in the presence of from 0.1% to 0.5% by weight of the carbonyl compound of at least one of the anhydrous and hydrated uranyl salts selected from the group consisting of uranyl chloride and uranyl nitrate, at a temperature of from $-40°$ to $50°$ C.

5. A process for preparing a $\beta$-lactone comprising reacting ketene ($CH_2=C=O$) with a carbonyl compound selected from the group represented by the following four general formulas:

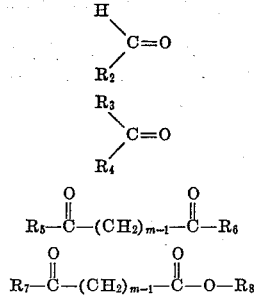

$$R_5-\overset{O}{\underset{\|}{C}}-(CH_2)_{m-1}-\overset{O}{\underset{\|}{C}}-R_6$$

$$R_7-\overset{O}{\underset{\|}{C}}-(CH_2)_{m-1}-\overset{O}{\underset{\|}{C}}-O-R_8$$

wherein $R_2$ represents a member selected from the group consisting of a hydrogen atom, an alkyl group of the formula $C_nH_{2n+1}$ wherein $n$ represents a positive integer of from 1 to 4, a benzyl group, a $\beta$-phenylethyl group and a phenyl ($C_6H_5$—) group, $R_3$ and $R_4$ each represents a member selected from the group consisting of an alkyl group of the formula $C_nH_{2n+1}$ wherein $n$ represents a positive integer of from 1 to 4, $R_5$ and $R_6$ each represents an alkyl group of the formula $C_nH_{2n+1}$ wherein $n$ represents a positive integer of from 1 to 3, $R_7$ represents an alkyl group selected from the group consisting of methyl and ethyl groups, and $R_8$ represents a member selected from the group consisting of primary and secondary alkyl groups of the formula $C_nH_{2n+1}$ wherein $n$ represents a positive integer of from 1 to 4 and $m$ represents a positive integer from 1 to 3, in a liquid medium consisting of a solution of from 0.01% to 2% by weight of the carbonyl compound of at least one of the anhydrous and hydrated uranyl salts selected from the group consisting of uranyl chloride and uranyl nitrate as the solute dissolved in at least one organic compound which is a liquid at the reaction temperature selected from the group consisting of the β-lactone being produced by the reaction, the carbonyl compound being employed in the reaction, dialkyl ethers, and cyclic ethers, at a temperature of from −40° C. to 50° C.

6. A process as set forth in claim 1 wherein the β-lactone prepared is β-propionolactone and the carbonyl compound selected is formaldehyde.

7. A process as set forth in claim 3 wherein the β-lactone prepared is β-propionolactone and the carbonyl compound selected is formaldehyde.

8. A process as set forth in claim 4 wherein the β-lactone prepared is β-propionolactone and the carbonyl compound selected is formaldehyde.

9. A process as set forth in claim 5 wherein the β-lactone prepared is β-propionolactone and the carbonyl compound selected is formaldehyde.

10. A process for preparing β-propionolactone comprising reacting ketene ($CH_2=C=O$) with formaldehyde in a liquid medium consisting of a solution of from 0.01% to 2% by weight of the formaldehyde of uranyl nitrate dissolved in diethyl ether, at a temperature of from −20° C. to 30° C.

11. A process for preparing β-propionolactone comprising adding ketene ($CH_2=C=O$) and formaldehyde in about equimolecular proportions to a liquid medium consisting of a solution of from 0.01% to 2% by weight of the formaldehyde of at least one of the anhydrous and hydrated uranyl salts selected from the group consisting of uranyl chloride and uranyl nitrate as the solute dissolved in at least one organic compound which is a liquid at the reaction temperature selected from the group consisting of the β-lactone being produced by the reaction, the carbonyl compound being employed in the reaction, dialkyl ethers, and cyclic ethers, at a temperature of from −40° C. to 50° C.

12. A process for preparing β-propionolactone comprising adding ketene ($CH_2=C=O$) and formaldehyde in about equimolecular proportions to a liquid medium consisting of a solution of from 0.01% to 2% by weight of the formaldehyde of uranyl nitrate dissolved in diethyl ether, at a temperature of from −20° C. to 30° C.

13. A process for preparing β-propionolactone comprising adding ketene ($CH_2=C=O$) and formaldehyde in about equimolecular proportions to a liquid medium consisting of a solution of from 0.1% to 0.5% by weight of the formaldehyde of uranyl nitrate dissolved in diethyl ether, at a temperature of from 0° C. to 10° C.

14. A process as set forth in claim 1 wherein the β-lactone prepared is γ-methyl-β-valerolactone and the carbonyl compound selected is isobutyraldehyde.

15. A process as set forth in claim 3 wherein the β-lactone prepared is γ-methyl-β-valerolactone and the carbonyl compound selected is isobutyraldehyde.

16. A process as set forth in claim 4 wherein the β-lactone prepared is γ-methyl-β-valerolactone and the carbonyl compound selected is isobutyraldehyde.

17. A process as set forth in claim 5 wherein the β-lactone prepared is γ-methyl-β-valerolactone and the carbonyl compound selected is isobutyraldehyde.

18. A process for preparing γ-methyl-β-valerolactone comprising reacting ketene ($CH_2=C=O$) with isobutyraldehyde in a liquid medium consisting of a solution of from 0.01% to 2% by weight of the isobutyraldehyde of uranyl chloride dissolved in diisopropyl ether, at a temperature of from −40° C. to 50° C.

JOHN R. CALDWELL.

REFERENCES CITED

The following references are of record in the file of this patent:

UNITED STATES PATENTS

| Number | Name | Date |
|---|---|---|
| 2,356,459 | Kung | Aug. 22, 1944 |
| 2,478,388 | Hagemeyer | Aug. 9, 1949 |
| 2,491,116 | Krauss | Dec. 13, 1949 |